US010291281B2

(12) United States Patent
Bavois

(10) Patent No.: US 10,291,281 B2
(45) Date of Patent: May 14, 2019

(54) TRANSMITTER-RECEIVER DEVICE CONNECTABLE TO A COMMUNICATIONS NETWORK BY A CAN-TYPE OR FLEXRAY-TYPE BUS

(71) Applicants: CONTINENTAL AUTOMOTIVE FRANCE, Toulouse (FR); CONTINENTAL AUTOMOTIVE GMBH, Hannover (DE)

(72) Inventor: Thierry Bavois, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/741,813

(22) PCT Filed: Jul. 5, 2016

(86) PCT No.: PCT/EP2016/001146
§ 371 (c)(1),
(2) Date: Jan. 4, 2018

(87) PCT Pub. No.: WO2017/005361
PCT Pub. Date: Jan. 12, 2017

(65) Prior Publication Data

US 2018/0198481 A1 Jul. 12, 2018

(30) Foreign Application Priority Data

Jul. 9, 2015 (FR) ..................................... 15 56510

(51) Int. Cl.
*H04B 1/40* (2015.01)
*H04L 12/40* (2006.01)

(52) U.S. Cl.
CPC ............... *H04B 1/40* (2013.01); *H04L 12/40* (2013.01); *H04L 12/40032* (2013.01);
(Continued)

(58) Field of Classification Search
CPC ..... H04B 1/40; H04L 12/40; H04L 12/40032; H04L 2012/40215; H04L 2012/40241; H04L 2012/40273
See application file for complete search history.

(56) References Cited

U.S. PATENT DOCUMENTS 6,654,351 B1 * 11/2003 Casey ................ G05B 19/0423 324/605
6,839,790 B2 1/2005 Barros De Almeida et al.
(Continued)

FOREIGN PATENT DOCUMENTS

EP 1 401 170 B1 11/2007
EP 1 632 865 B1 5/2010
(Continued)

OTHER PUBLICATIONS

International Search Report, dated Sep. 9, 2016, from corresponding PCT application No. PCT/EP2016/001146.

*Primary Examiner* — Freshteh N Aghdam
(74) *Attorney, Agent, or Firm* — Young & Thompson

(57) ABSTRACT

Disclosed is an electronic transmitter-receiver device for integrating into an electronic module connected to a communication network by a bus, the bus being of the CAN or FlexRay type, the electronic transmitter-receiver device including a receiving assembly (R) and a control part (D) which are configured so as to allow switching from a CAN operating mode to a FlexRay operating mode of the device, and vice versa, without needing to change the electronic component.

20 Claims, 2 Drawing Sheets

(52) U.S. Cl.
CPC ............... *H04L 2012/40215* (2013.01); *H04L 2012/40241* (2013.01); *H04L 2012/40273* (2013.01)

(56) References Cited

U.S. PATENT DOCUMENTS

| | | | | |
|---|---|---|---|---|
| 6,853,645 | B1 | 2/2005 | Chang et al. | |
| 8,185,678 | B1 | 5/2012 | Azad | |
| 8,527,147 | B2 | 9/2013 | Daly et al. | |
| 8,732,375 | B1 | 5/2014 | Vijayaraghavan et al. | |
| 8,825,289 | B2 | 9/2014 | Daly et al. | |
| 2003/0236937 | A1 | 12/2003 | Barros De Almeida et al. | |
| 2004/0098139 | A1 | 5/2004 | Fehrer et al. | |
| 2006/0100759 | A1* | 5/2006 | Horbelt | H04L 12/40 701/36 |
| 2006/0106966 | A1 | 5/2006 | Joos et al. | |
| 2011/0022766 | A1* | 1/2011 | Beckmann | H04L 12/40032 710/305 |
| 2011/0080269 | A1* | 4/2011 | Wagner | H04L 12/40032 340/10.33 |
| 2012/0119793 | A1* | 5/2012 | Butselaar | H04L 25/028 327/108 |
| 2013/0275784 | A1* | 10/2013 | Doring | H04L 12/10 713/310 |
| 2014/0122756 | A1 | 5/2014 | Laskar | |
| 2015/0249078 | A1* | 9/2015 | Cao | H01L 27/0255 257/546 |
| 2016/0294578 | A1* | 10/2016 | Maise | H04L 12/4011 |
| 2017/0093908 | A1* | 3/2017 | Elend | H04L 1/0045 |
| 2017/0329388 | A1* | 11/2017 | Pihet | G06F 1/3287 |

FOREIGN PATENT DOCUMENTS

| | | | |
|---|---|---|---|
| EP | 2 479 678 | A2 | 7/2012 |
| WO | 2008/087131 | A2 | 7/2008 |

* cited by examiner

TRANSMITTER-RECEIVER DEVICE CONNECTABLE TO A COMMUNICATIONS NETWORK BY A CAN-TYPE OR FLEXRAY-TYPE BUS

The invention relates to electronic components able to be integrated into electronic modules that are connected to on-board bus communication networks. More precisely, the invention relates to what is commonly known to those skilled in the art as a transceiver device, intended to be integrated into an electronic module, between a connector for linking to a communication bus and a microprocessor, and able to operate both in a CAN bus communication network context and in a FlexRay bus communication network context.

Specifically, in particular in the automotive field, but also in other technical fields, in particular in the field of various land and air transport means, communication by serial bus is extremely widespread.

Although the initial aim of introducing multiplexed buses in the automotive field was to reduce the amount of cables required by enabling various appliances to communicate on one and the same shared line, it has also enabled the number of computers embedded on board vehicles to be increased.

BACKGROUND OF THE INVENTION

Two types of bus in particular are nowadays widespread, in particular in the automotive field. The first to have been implemented is the CAN (acronym for Controller Area Network) bus. This bus was standardized by way of the standard ISO 11898.

Its practically universal deployment in numerous industries, in particular in the automotive field, has made it an almost indispensable technology.

The ‘FlexRay’ serial bus, developed more recently, is another bus communication system.

This technology was initially developed to meet the specific needs of the automotive or aeronautical sector in a manner more efficient than the CAN bus. A consortium comprising various industrial groups promoted the use of ‘FlexRay’ serial buses, and said bus was standardized by way of a set of ISO standards, between standard ISO 17458-1 and standard ISO 17458-5.

The FlexRay bus has the advantage of enabling the transit of data at bit rates of the order of 10 Mb/s, as opposed to 1 Mb/s to 5 Mb/s for the CAN bus.

In particular in the field of the automotive industry, the two standards—CAN and FlexRay—exist side by side, FlexRay being beneficial for its greater capabilities in terms of bit rate, but the CAN bus being historically implanted in many certified electronic appliances to such an extent that it survives and continues to be used to a significant extent, including in new appliances currently being developed.

Now, these two standards are not immediately compatible. In the context of the design of new appliances, it is generally necessary to design electronic modules that are intended either to be connected to a CAN bus or to be connected to a FlexRay bus. This forces manufacturers, in particular automotive equipment manufacturers, to develop various references for these new appliances, comprising electronic modules equipped with different transceivers, depending on whether said bus complies with the CAN standard or with the FlexRay standard. However, this requirement to develop separate transceivers, to be integrated into the electronic appliances—computers, sensors— in order to take account of the specificities of CAN and FlexRay buses, creates additional costs.

In an attempt to mitigate this problem, electronic modules comprising both types of transceiver—CAN and FlexRay—have been developed. However, this solution is not satisfactory, in that it is not flexible and is still expensive. In addition, according to this prior art, it is necessary to have two communication buses present in order to enable the module to dialog both in compliance with the CAN protocol and in compliance with the FlexRay protocol.

Document US 2011/0022766 gives an example of such a known transceiver.

A need has therefore emerged for a transceiver that has the advantage of being both economical and able to interact with both a CAN bus and a FlexRay bus.

SUMMARY OF THE INVENTION

To this end, the present invention concerns the development of transceivers that are able to be configured on the fly via a selector, in particular after integration into an electronic module, and that are able to interact both with a CAN bus and with a FlexRay bus.

More precisely, the present invention relates to an electronic transceiver device intended to be integrated into an electronic module connected to a bus communication network, said bus being able to be of CAN or FlexRay type, said electronic transceiver device comprising a receiver assembly and a drive part. The electronic transceiver device according to the invention is noteworthy in that the receiver assembly comprises at least two receivers, namely:

- a first differential receiver comprising an input connected to two lines, namely a first high line and a first low line, the first high line comprising a selector configured such that, in a CAN position of the selector, said first high line has a voltage offset of 700 mV and, in a FlexRay position of the selector, said first high line has a voltage offset of 450 mV, the first receiver in addition comprising a comparator comparing the potential of the first high line, after the voltage offset has been applied, and the potential of the first low line,
- a second differential receiver comprising an input connected to two lines, namely a second high line and a second low line, the second high line having a negative voltage offset of −450 mV, the second receiver in addition comprising a comparator comparing the potential of the second high line, after the voltage offset has been applied, and the potential of the second low line, and in that the drive part comprises at least two differential regulators, namely a first differential regulator connected at the output to a high output line and a second differential regulator connected at the output to a low output line, each of said two differential regulators having a reference potential and being able to apply, at the input of each of said differential regulators, on the high output line and on the low output line, respectively, a predetermined reference differential voltage that is dependent on the type of bus, CAN or FlexRay, to which the device is connected, and able to be selected independently such that, at the output of the drive part, if the high output line has a higher potential than the low output line, the driver transmits an item of digital information corresponding to the value 1, and, conversely, if the low output line has a higher potential than the high output line, the driver transmits an item of digital information corresponding to the value 0.

According to one embodiment, the electronic transceiver device furthermore includes a third differential receiver able to provide the function of waking the electronic module.

According to one embodiment, the differential regulators are powered, through an appropriate diode and transistor, by a line voltage supplied directly by a battery.

According to one embodiment, the reference potential of the differential regulators is identical and equal to 2.5 V, whether the device is connected to a CAN or FlexRay bus.

According to one embodiment, the reference differential voltage able to be selected has a value, for the first differential regulator, of 2.5 V+1 V; or 2.5 V+0.5 V; or 2.5 V−0.5 V; and, for the second differential regulator, of 2.5 V−1 V; or 2.5 V−0.5 V; or 2.5 V+0.5 V.

Furthermore, the transceiver device according to the invention may comprise means for imposing, at the input of each of said first and second differential regulators, in one specific mode of operation, termed ‘idle’, a high impedance, corresponding to an impedance with a high resistance, connected continuously between the high output line and the low output line, for each of said first and second differential regulators.

To this end, the drive part may be configured such that the impedance between the high line and the low line, for each of said first and second differential regulators, has a resistance that is approximately equal to a termination resistor. Such a termination resistor, wired between said high line and said low line, typically has a value of around 25 kΩ.

According to one embodiment, the differential regulators are powered by a line voltage of a battery.

The present invention also targets an electronic module comprising a microprocessor including a controller, said electronic module furthermore including an electronic transceiver device such as briefly described above, and the microprocessor including a multiplexer enabling the selection of a CAN or FlexRay mode of operation of said microprocessor controller and the corresponding indication of the CAN or FlexRay position of the selector of the electronic transceiver device.

The invention also relates to a motor vehicle comprising an electronic module, said electronic module including an electronic transceiver device such as briefly described above.

BRIEF DESCRIPTION OF THE DRAWINGS

The invention will be better understood upon reading the following description, given solely by way of example, and with reference to the appended drawings, in which.

DETAILED DESCRIPTION OF THE PREFERRED EMBODIMENTS

It should be noted that the figures disclose the invention in a detailed manner so as to enable the implementation thereof, said figures also being able to serve to better define the invention, of course.

The invention is presented primarily for the purpose of an application in a motor vehicle. However, other applications are also targeted by the present invention, in particular for the purpose of an implementation in any type of land vehicle.

Figure 1:
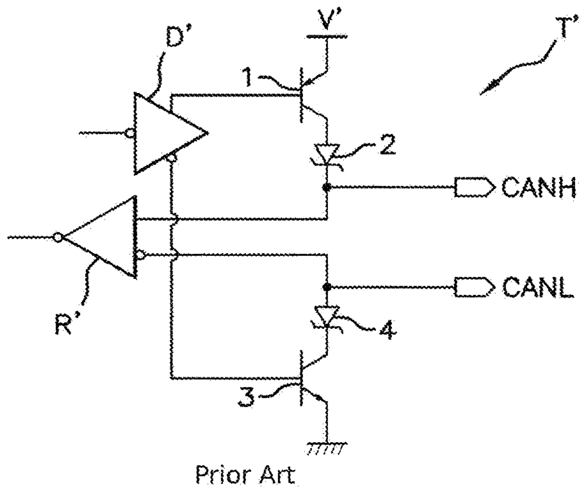
FIG. 1 depicts a circuit diagram of a transceiver according to the prior art.

With reference to FIG. 1, a transceiver T' may be depicted in a simplified manner as forming an electronic component integrated into an electronic module also comprising a connector, linking the transceiver to a communication bus, and a microprocessor.

The transceiver T' comprises a driver D' and a receiver assembly R'. It is linked to the communication bus, for example a CAN bus or a FlexRay bus. Such a bus consists of a differential line comprising two physical wires linking said bus to the transceiver by way of these wires, forming a high line CANH and a low line CANL. It may be noted that these terms CANH and CANL are common in the technical field for denoting the high and low lines of a CAN bus, whereas the high and low lines of a FlexRay bus are generally denoted BP and BM, the principle remaining very similar.

The receiver assembly R' thus provides the function of reading and interfacing with the bus, whereas the driver D' provides interfacing with the microprocessor. The driver D' is furthermore a component that is protected against electrostatic discharges and against electromagnetic incompatibility, from which protection the transceiver consequently benefits. In a known manner, the driver D' is configured to enable the electronic module to send data to the bus while continuing to read the same bus at the same time.

The circuit of the transceiver T' furthermore includes a transistor 1, powered by a supply voltage V', and a diode 2 that are connected to the high line CANH, and also a transistor 3, linked to ground, and a diode 4 that are connected to the low line CANL.

Moreover, although these elements are not depicted in the simplified diagram of FIG. 1, a transceiver, whether of CAN or FlexRay type, comprises a termination resistor, wired between the high line and the low line and providing a matching function. A standard transceiver also includes a choke providing the coupling between the high line and the low line in such a way as to optimize the performance of the transceiver with respect to electromagnetic disturbances.

For reasons outlined in the preamble, there is a need for a transceiver that is able to interact both with a CAN bus and with a FlexRay bus.

As has been shown previously, the transceivers for CAN and FlexRay buses operate in a similar manner. The structural differences between the two types of transceiver relate to the fact that:

- the CAN transceiver requires just one receiver, while the FlexRay transceiver comprises at least two thereof;
- the CAN transceiver has only two possible states to transmit (0 or 1, 0 being said to be ‘recessive’), whereas the FlexRay transceiver has three possible states to transmit (0, 1 or ‘recessive’).

Figure 2:
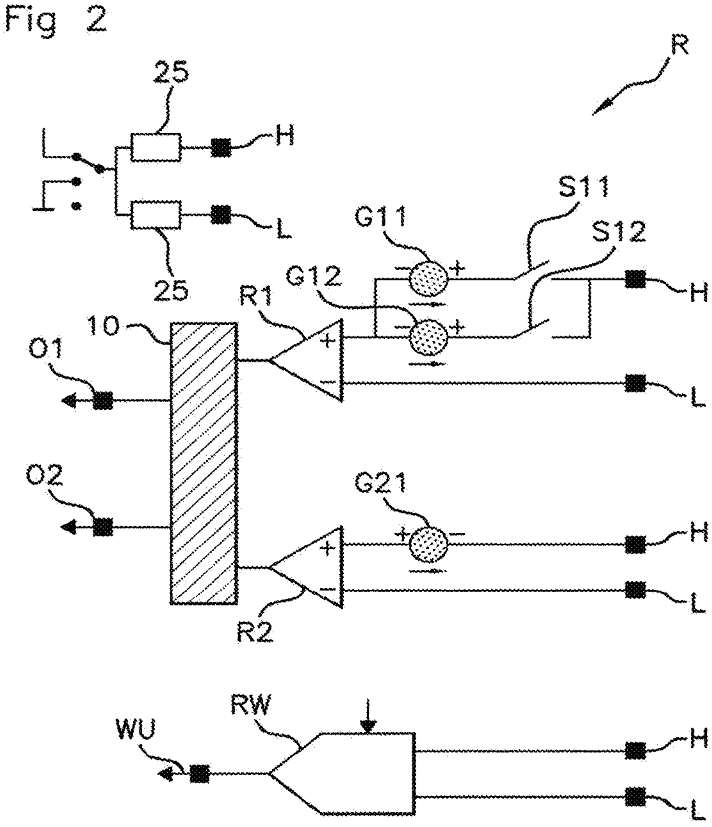
FIG. 2 depicts the diagram showing the receiver part of a transceiver according to the invention.

As a result, with reference to FIG. 2, the transceiver device according to the invention comprises a receiver assembly R including two receivers R1, R2.

The receivers R1, R2 are connected to the high line H and to the low line L of a CAN or FlexRay communication bus.

The first receiver R1 is necessary both in CAN configuration and in FlexRay configuration of the electronic module. This first receiver R1 comprises two voltage offsets G11, G12 that are applied to the signal routed on the high line H. A selector makes it possible to configure which of these voltage offsets will be applied.

In a CAN position of the selector, the switch S11 is closed and the switch S12 is open. In this case, it is the voltage offset G11 that is applied: the latter has a value of 700 mV according to the preferred embodiment.

In a FlexRay position of the selector, the switch S12 is closed and the switch S11 is open. In this case, it is the voltage offset G12 that is applied: the latter has a value of 450 mV according to the preferred embodiment.

The second receiver R2 is necessary only in FlexRay configuration of the electronic module. A voltage offset G21 having a value of −450 mV is applied to the high line according to the preferred embodiment.

Via an internal logic unit 10, the receiver assembly R comprises at least two output pins O1, O2 forming the interconnection with the microprocessor (not shown). These two output pins O1, O2 are used to transmit the states of the CAN or FlexRay bus. The output O1 thus makes it possible to transmit the state, 0 or 1, of the CAN bus when the device is connected to a CAN bus, whereas when the device is connected to a FlexRay bus, the two output pins O1, O2 are used to provide the state, 0, 1 or recessive, of the FlexRay bus.

It should be noted that, in a known manner, said microprocessor comprises two types of controller that are able respectively to process data originating from a CAN bus or from a FlexRay bus, said controllers being associated with multiplexing means.

Furthermore, the termination resistors 25, with a resistance typically equal to 25 kΩ and connected between the high line H and the low line L, provide a function of matching the potential of said lines.

These termination resistors 25 are specifically used to adjust the transmission line, which may be complex, in particular, when a plurality of CAN or FlexRay buses are connected in parallel.

It should be noted that the termination resistor 25 is defined identically in the CAN and FlexRay standards, making it easier to be able to design a transceiver that is compatible with said CAN and FlexRay standards, without having to change these termination resistors 25.

Optionally, the receiver assembly of the transceiver according to the invention may also comprise a third receiver RW, termed waking receiver, capable of enabling the electronic module to exit a standby mode depending on a supply voltage of said third receiver RW, by way of an output pin WU.

This output pin WU then makes it possible to wake the microprocessor and all of the power supplies necessary therefor. This is possible, in particular, due to the fact that the transceiver according to the invention is able to be powered autonomously, directly by the line voltage of the battery.

Figure 3:
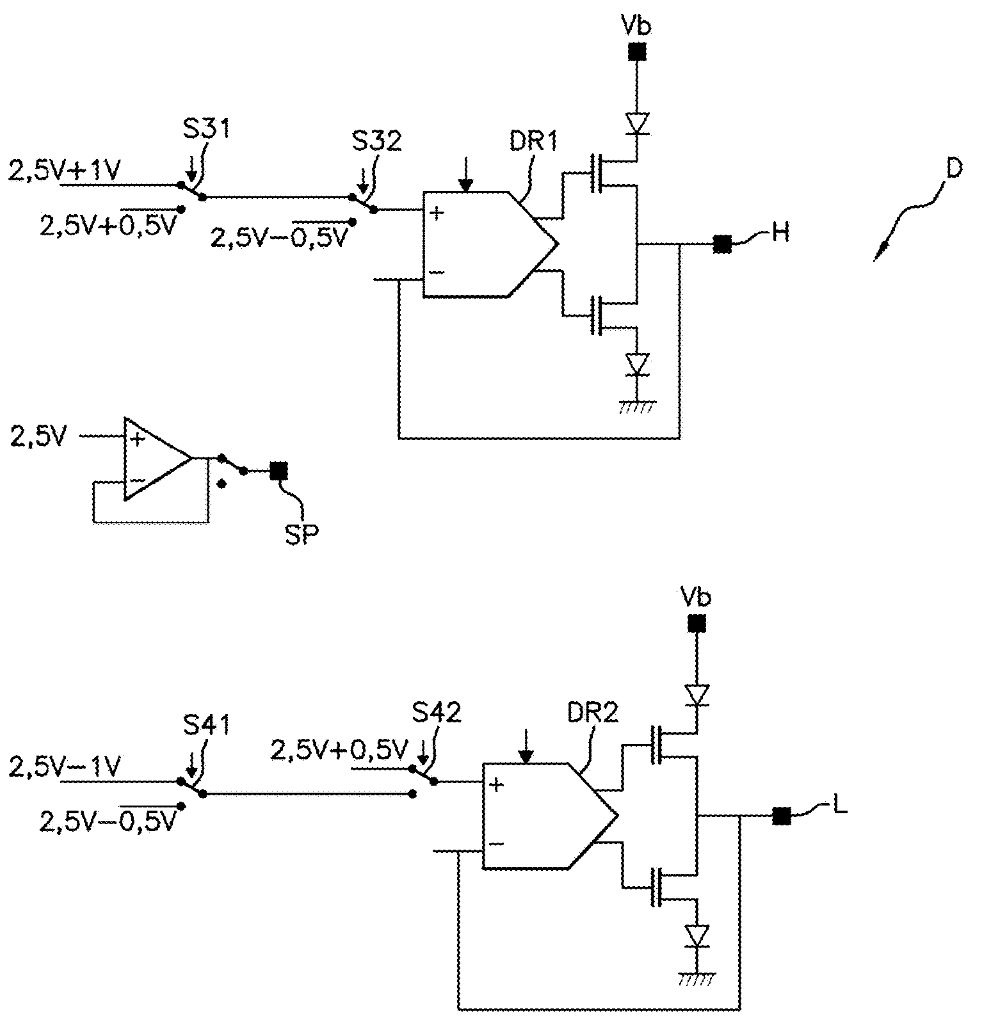
FIG. 3 depicts the diagram showing the drive part of a transceiver according to the invention.

With reference to FIG. 3, the transceiver device according to the invention comprises a drive part D including two differential regulators DR1, DR2 whose function is to regulate specifically the potentials of the two lines, high and low.

These differential regulators DR1, DR2 consist of push/pull voltage regulators that are able to send current to the high line H or low line L of the bus or, reciprocally, to draw current therefrom.

The first regulator DR1 is connected to the high line H, whereas the second differential regulator DR2 is connected to the low line L.

One advantage of these push/pull regulators lies in the fact that they make it possible both to create positive voltages, such as on the high line H, or to impose low-level voltages, such as on the low line L. This feature also makes it possible to invert the output voltages, as is required by a FlexRay bus. This type of output furthermore has the advantage of being strongly immune to the stress of electromagnetic compatibility.

The differential regulators DR1, DR2 are powered by a supply voltage Vb, which may be a line voltage supplied by the battery, in the context of a motor vehicle for example. The positive input of each of the differential regulators DR1, DR2 is configured to have a potential that is dependent firstly on the position of a selector—CAN position or FlexRay position—and secondly on the value—0 or 1—of the bit to be transmitted.

Furthermore, the differential regulators DR1, DR2 operate with a reference potential that is identical and equal to 2.5 V.

This identical reference potential enables the CAN or FlexRay bus to have a quiescent voltage without a voltage offset that is always identical and equal to 2.5 V, but also to have a sum of the potentials of the high line and the low line that is always identical and equal to 2×2.5 V, bestowing on the transceiver device a high performance in terms of electromagnetic emission, that is to say a low level of electromagnetic emission.

Thus, for example, in the CAN position, for an output state having a value of 1, the first differential regulator DR1 will supply a voltage of 2.5 V+1 V on the high line H, and the second differential regulator DR2 will supply a voltage of 2.5 V−1 V on the low line L. By contrast, for an output state having a value of 0 (termed the recessive state), the two differential regulators will have a high impedance imposed on them.

In the FlexRay position, the first differential regulator DR1, connected to the high line H, may be both at 2.5 V+500 mV for an output state having a value of 1, and at 2.5 V−500 mV for an output state having a value of 0. The second differential regulator DR2, connected to the low line L, will by contrast supply a voltage of 2.5 V−500 mV for an output state having a value of 1, and a voltage of 2.5 V+500 mV for an output state having a value of 0.

It should be noted that the differential regulators DR1, DR2 include a wire, termed ‘idle’, making it possible to ‘switch off’ the corresponding differential regulator by imposing a high impedance on it.

Optionally, the differential regulators DR1, DR2 may also contain additional functions, making it possible to perform diagnostics on the bus, or even to provide protection against any overvoltage or overcurrent, in particular in order to send any corresponding alerts to the microprocessor.

In particular, the split function, known from the prior art, may be provided. Said split function makes it possible to bias the midpoint of the termination resistor to a potential corresponding to the median potential of 2.5 V.

In summary, the present invention relates to what is commonly known as an electronic transceiver device, designed to operate both with a CAN bus and with a FlexRay bus.

One key benefit of this invention lies in its flexibility, given that the transceiver according to the invention is able to be integrated into a standard electronic module and be configured on the fly depending on the bus to which it is ultimately connected.

The ability to change configuration easily, in order to switch from CAN operation to FlexRay operation, simply by modifying the position of a selector is particularly appreciable in the automotive field, in which the number of electronic modules is very high, and in which the CAN and FlexRay standards for communication buses largely exist side by side.

One particular application that is envisioned in the automotive field typically makes use of the ability to switch from a high-bit-rate application of the electronic module equipped with the transceiver according to the invention to a low-bit-rate application. For example, an electronic module may be configured for use in a mode connected to a CAN bus, in nominal operation, and be configured for use in a mode connected to a FlexRay bus when the vehicle is being prepared in the factory or during maintenance operations. Switching from one mode of operation to the other is performed simply, on the fly.

Another advantage of the transceiver according to the invention lies in the fact that its components, receivers R1, R2, RW and differential regulators DR1, DR2, are able to be powered with a voltage supplied by a battery.

The advantage of a power supply only from the battery specifically enables greater flexibility in the management of the power supplies. For example, in the context of a device connected to a CAN bus, it is currently essential to have a voltage regulator at 5 V, powered in standby mode (very low consumption), and that has a very low-consumption complex specification. Such a voltage regulator is made unnecessary through the implementation of the device according to the invention. The power supply from the battery also makes the presence of a 5 V supply pin at the transceiver unnecessary. Lastly, the power supply for the transceiver according to the invention, directly from the battery, enables the integration of a third receiver, termed waking receiver, that is powered by the battery.

It is clarified furthermore that the present invention is not limited to the examples described above, and is open to many variants that are accessible to those skilled in the art.

The invention claimed is:

1. An electronic transceiver device for operation with an electronic module connected to a single bus communication network, said bus being of Controller Area Network (CAN) or FlexRay type, said electronic transceiver device comprising:

a receiver assembly (R); and a drive part (D), wherein the receiver assembly (R) comprises at least two receivers, including a first differential receiver (R1) including an input connected to a first high line (H) and a first low line (L), the first high line comprising a selector configured such that, in a CAN position of the selector (S11), said first high line (H) has a voltage offset of 700 mV and, in a FlexRay position of the selector (S12), said first high line (H) has a voltage offset of 450 mV, the first receiver (R1) also including a comparator that compares the potential of the first high line (H), after the voltage offset has been applied, and the potential of the first low line (L), a second differential receiver (R2) including an input connected to a second high line (H) and a second low line (L), the second high line (H) having a negative voltage offset of −450 mV, the second receiver (R2) also including a comparator that compares the potential of the second high line (H), after the voltage offset has been applied, and the potential of the second low line (L), and wherein the drive part includes a first differential regulator (DR1) connected at the output to a high output line (H) and a second differential regulator (DR2) connected at the output to a low output line (L), each of said first and second differential regulators (DR1, DR2) having a reference potential and, each of said first and second differential regulators (DR1, DR2) configured to apply, at the input of each of said differential regulators (DR1, DR2), on the high output line (H) and on the low output line (L), respectively, a predetermined reference differential voltage that is dependent on whether the bus to which the device is connected is of CAN type or of FlexRay type, and independently selectable such that, at the output of the drive part (D), if the high output line (H) has a higher potential than the low output line (L), the drive part (D) transmits an item of digital information corresponding to a value 1, and, conversely, if the low output line (L) has a higher potential than the high output line (H), the drive part (D) transmits an item of digital information corresponding to a value 0.

2. The electronic transceiver device as claimed in claim 1, further comprising:

a third differential receiver (RW) configured to wake the electronic module.

3. The electronic transceiver device as claimed in claim 1, wherein the differential regulators (DR1, DR2) are powered, through a diode and transistor, by a line voltage (Vb) supplied directly by a battery.

4. The electronic transceiver device as claimed in claim 1, wherein the reference potential of the differential regulators is identical and equal to 2.5 V.

5. The electronic transceiver device as claimed in claim 1, wherein the reference differential voltages of the first and second differential regulators are selectable as follows:

for the first differential regulator, 2.5 V+1 V, or 2.5 V+0.5 V, or 2.5 V−0.5 V; and for the second differential regulator, 2.5 V−1 V, or 2.5 V−0.5 V, or 2.5 V+0.5 V.

6. The electronic transceiver device as claimed in claim 1, further comprising:

means for imposing, at the input of each of said first and second differential regulators (DR1, DR2), in an idle mode of operation, a high impedance, corresponding to an impedance with a high resistance, connected continuously between the high output line (H) and the low output line (L), for each of said first and second differential regulators (DR1, DR2).

7. The electronic transceiver device as claimed in claim 6, wherein the resistance of said high impedance has a value of around 25 kΩ.

8. The electronic transceiver device as claimed in claim 1, wherein the differential regulators (DR1, DR2) are powered by a line voltage (Vb) of a battery.

9. An electronic module comprising a microprocessor including a controller, wherein said electronic module furthermore includes an electronic transceiver device as claimed in claim 1, and wherein the microprocessor includes a multiplexer enabling the selection of a CAN or FlexRay mode of operation of said microprocessor controller and the corresponding indication of the CAN or FlexRay position of the selector of the electronic transceiver device.

10. A motor vehicle comprising an electronic module, wherein said electronic module includes an electronic transceiver device as claimed in claim 1.

11. The electronic transceiver device as claimed in claim 2, wherein the differential regulators (DR1, DR2) are powered, through a diode and transistor, by a line voltage (Vb) supplied directly by a battery.

12. The electronic transceiver device as claimed in claim 2, wherein the reference potential of the differential regulators is identical and equal to 2.5 V.

13. The electronic transceiver device as claimed in claim 3, wherein the reference potential of the differential regulators is identical and equal to 2.5 V.

14. The electronic transceiver device as claimed in claim 2, wherein the reference differential voltages of the first and second differential regulators are selectable as follows:

for the first differential regulator,
- 2.5 V+1 V, or
- 2.5 V+0.5 V, or
- 2.5 V−0.5 V; and for the second differential regulator,
- 2.5 V−1 V, or
- 2.5 V−0.5 V, or
- 2.5 V+0.5 V.

15. The electronic transceiver device as claimed in claim 3, wherein the reference differential voltages of the first and second differential regulators are selectable as follows:

for the first differential regulator,
- 2.5 V+1 V, or
- 2.5 V+0.5 V, or
- 2.5 V−0.5 V; and for the second differential regulator,
- 2.5 V−1 V, or
- 2.5 V−0.5 V, or
- 2.5 V+0.5 V.

16. The electronic transceiver device as claimed in claim 4, wherein the reference differential voltages of the first and second differential regulators are selectable as follows:

for the first differential regulator,
- 2.5 V+1 V, or
- 2.5 V+0.5 V, or
- 2.5 V−0.5 V; and for the second differential regulator,
- 2.5 V−1 V, or
- 2.5 V−0.5 V, or
- 2.5 V+0.5 V.

17. The electronic transceiver device as claimed in claim 2, further comprising:

means for imposing, at the input of each of said first and second differential regulators (DR1, DR2), in an idle mode of operation, a high impedance, corresponding to an impedance with a high resistance, connected continuously between the high output line (H) and the low output line (L), for each of said first and second differential regulators (DR1, DR2).

18. The electronic transceiver device as claimed in claim 3, further comprising:

means for imposing, at the input of each of said first and second differential regulators (DR1, DR2), in an idle mode of operation, a high impedance, corresponding to an impedance with a high resistance, connected continuously between the high output line (H) and the low output line (L), for each of said first and second differential regulators (DR1, DR2).

19. The electronic transceiver device as claimed in claim 4, further comprising:

means for imposing, at the input of each of said first and second differential regulators (DR1, DR2), in an idle mode of operation, a high impedance, corresponding to an impedance with a high resistance, connected continuously between the high output line (H) and the low output line (L), for each of said first and second differential regulators (DR1, DR2).

20. The electronic transceiver device as claimed in claim 5, further comprising:

means for imposing, at the input of each of said first and second differential regulators (DR1, DR2), in an idle mode of operation, a high impedance, corresponding to an impedance with a high resistance, connected continuously between the high output line (H) and the low output line (L), for each of said first and second differential regulators (DR1, DR2).

* * * * *